US012109596B2

(12) United States Patent
Earp

(10) Patent No.: US 12,109,596 B2
(45) Date of Patent: Oct. 8, 2024

(54) EFFLUENT CONTAINMENT DEVICES HAVING IMPROVED SAFETY

(71) Applicant: Danny Earp, La Porte, TX (US)

(72) Inventor: Danny Earp, La Porte, TX (US)

( * ) Notice: Subject to any disclaimer, the term of this patent is extended or adjusted under 35 U.S.C. 154(b) by 244 days.

(21) Appl. No.: 17/733,409

(22) Filed: Apr. 29, 2022

(65) Prior Publication Data

US 2022/0347728 A1 Nov. 3, 2022

Related U.S. Application Data

(60) Provisional application No. 63/182,622, filed on Apr. 30, 2021.

(51) Int. Cl.
*B08B 17/02* (2006.01)
*B08B 9/043* (2006.01)
*F28G 15/00* (2006.01)

(52) U.S. Cl.
CPC .......... *B08B 17/025* (2013.01); *B08B 9/0433* (2013.01); *F28G 15/00* (2013.01); *B08B 2209/04* (2013.01)

(58) Field of Classification Search
CPC .................................................... B08B 17/025
See application file for complete search history.

(56) References Cited

U.S. PATENT DOCUMENTS 10,195,651 B2 2/2019 Earp

FOREIGN PATENT DOCUMENTS

| | | | |
|---|---|---|---|
| CA | 2235040 | A1 | 11/1998 |
| EP | 0318072 | A2 | 5/1989 |
| EP | 3702398 | A1 | 9/2020 |
| WO | 2020081430 | A1 | 4/2020 |

*Primary Examiner* — Jason Y Ko
(74) *Attorney, Agent, or Firm* — Condo Roccia Koptiw LLP

(57) ABSTRACT

Effluent containment devices are made of flame-resistant material having a Flame Spread Index of greater than zero and less than 30. The material may also have anti-static properties, such as being formed of a dissipative material or one that resists flow electrification.

19 Claims, 3 Drawing Sheets

EFFLUENT CONTAINMENT DEVICES HAVING IMPROVED SAFETY

FIELD OF THE INVENTION

The present invention relates to devices and methods for cleaning industrial equipment via a fluid jet, and more particularly devices and methods for containing effluent from cleaning industrial equipment via a fluid jet, such as hydroblasting.

BACKGROUND

Petrochemical plants and other industrial facilities often collect effluent from industrial cleaning operations and/or maintenance operations. Examples of effluent containment devices for handling effluent from a hydroblasting operation are disclosed in U.S. Pat. No. 7,753,090, entitled "Blasting Fluid Effluent Containment Device." Additional examples of effluent containment devices and anti-static means are disclosed in U.S. Pat. No. 10,195,651, entitled "Blasting Fluid Effluent Containment Device." Many effluent containment devices as generally described in these patents are used to capture effluent (such as water and hydrocarbon residue) from a cleaning process in petrochemical and other industrial plants. Some hydroblasting operations use sand or other additive with water. Each of 090 and the 651 patents share inventorship with the present invention.

Existing effluent containment devices typically are formed of conventional materials, such as those generally described in the above patens Examples of effluent containment devices include the HX Containment™ System, Fin Fan Containment™ System, Trough Containment™ System, and Flange Wrap™, which are available from The Blast Bag Company, Inc. of LaPorte, Texas.

U.S. Pat. No. 7,334,587, entitled "Fluid Containment Assembly For Use In Hydroblast Cleaning," discloses an effluent containment device having a metal end shield that is spaced from and axially aligned with the downstream end of the heat exchanger and a metal annular shield that surrounds the area between the end shield and the distal end of the heat exchanger. A waterproof flexible shroud is disposed about the shield portions of the assembly. The metal end shield and metal annular shield are not flammable—that is, have a Flame Spread Index of zero.

Within the petrochemical plant hydroblasting industry, it is understood that electrostatic charge can be created during hydroblasting (and like cleaning operations) of heat exchangers and other vessels by the liquid flowing over the internal surfaces of the materials commonly uses for effluent containment devices. The buildup of an electrostatic charge, sometimes referred to as flow electrification, could possibly result in an electrostatic discharge in the presence of hydrocarbons in an effluent containment device.

It was understood that the exterior of effluent containment devices could be protected from fire risk from sources of initiation of combustion, if needed, by employing an exterior metal structure, such as a metal shell or a metal skin, having a Flame Spread Index of zero. Further, conventional wisdom has been that petrochemical and other industrial plants have rigorous safety procedures that eliminate or mitigate the risk from outside of effluent contain devices. Thus, the focus of safety of effluent containment devices has focused on the development and implementation of measures to diminish risk of electrostatic discharge developed inside of the effluent containment device.

SUMMARY

The inventor has determined that the conventional wisdom in the hydroblasting industry for petrochemical plants regarding explosion and fire risk protection can be insufficient in some circumstances. In this regard, conventional safety procedures in petrochemical manufacturing facilities may not be adequate or fail-safe in all situations, especially when a facility has limited time-span during a shut-down for performing all maintenance and repair tasks. In this regard, even though the vessels (such as a heat exchangers) typically are not in service during hydroblast cleaning, and even where the risk of flow electrification and other static discharge risks have already been mitigated, sources of the initiation of combustion may come from unexpected, external sources.

For example, even though petrochemical plants have extensive safety procedures, sparks from welding or torch-cutting, or splatter or sparks from welding operations, can inadvertently escape from safety containment areas and contact the effluent containment devices—sometimes from one or more floors above the vessel to be cleaned, and/or deflected from sources not directly overhead an effluent containment device. Accordingly, at least a portion of the sidewall of the effluent containment device is formed of a flame-resistant material that does not support self-sustaining combustion.

An effluent containment device for handling effluent from a hydroblasting operation comprises: an interface portion adapted for coupling with an end of an effluent source; an enclosure adapted for containing effluent from a hydroblasting operation, the enclosure having a sidewall that is flexible and formed of material comprising a flame-resistant material having Flame Spread Index (FSI) greater than zero and no more than 70. The sidewall does not support self-sustaining combustion upon encountering a combustion initiation source.

Various magnitudes of FSI may be employed, such as no more than approximately 60, no more than approximately 50, no more than approximately 60, no more than approximately 40, no more than approximately 30, and preferably no more than approximately 25, preferably less than approximately 20, preferably less than approximately 15 and even more preferably less than approximately 10. The lower range of sidewall FSI is greater than zero, or greater than approximately 2.

The sidewall of the effluent containment device may be formed from a material having anti-static properties. In this regard, the material may be adapted to generate no more than 400 volts upon flow electrification during hydroblasting, and preferably no more than 200 volts upon flow electrification during hydroblasting. The material of the sidewall may be configured such that at least a portion of the sidewall has an electrical surface resistance between 1×10ˆ6 ohms/square and 1×10ˆ11 ohms/square, such that the sidewall is classified as dissipative.

The flame-resistant material of the sidewall may be a single layer of flame-resistant material. Or the sidewall may or may be at least two layers, where the flame-resistant material is an outermost one of the at least two layers of the sidewall or alternatively an innermost layer or an interior layer between the outermost and innermost layers. It is preferred that the entire structure of the sidewall satisfy the requirement of not supporting self-sustaining combustion.

The interior of the effluent containment device may be capable of withstanding direct impingement on an interior surface from a hydroblasting wand. The effluent containment device may be an effluent containment bag adapted for collecting effluent from a hydroblasting operation, an operator-side trough, or a wrap adapted for receiving leakage from a pipe flange or valve.

A method of using the effluent containment device comprising the steps of: installing the effluent containment device to a source of effluent; and capturing the effluent from source in the effluent containment device.

A combination vessel and effluent containment device is also provided that includes: a vessel that is a source of effluent; and an effluent containment device paragraphs mounted on the vessel and adapted for containing the effluent. The vessel can be a heat exchanger in a hydroblasting cleaning operation.

DETAILED DESCRIPTION OF THE INVENTION

Figure 1:
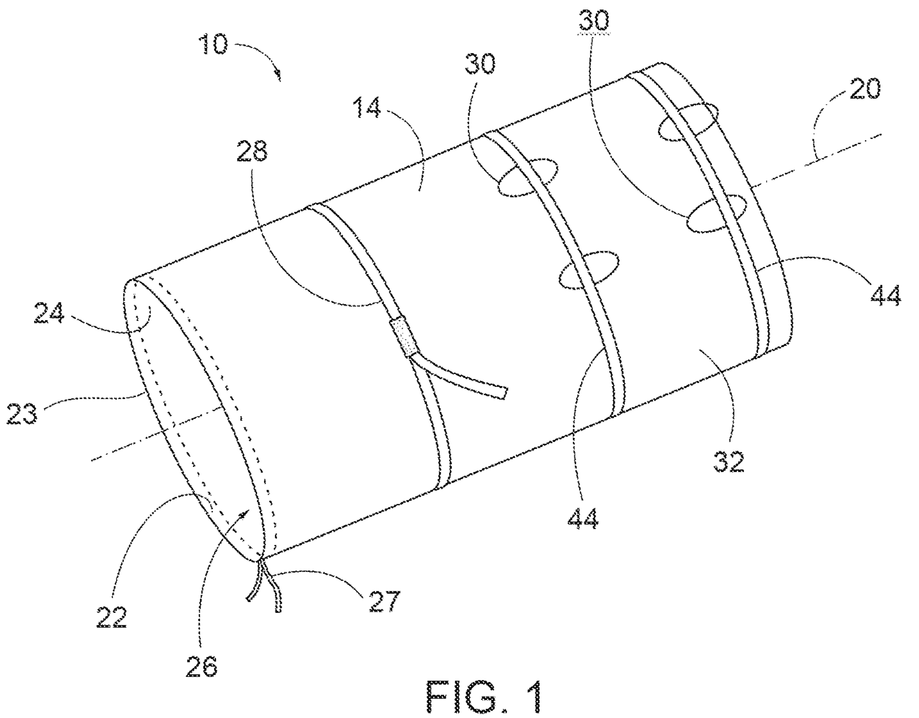
FIG. 1 is a perspective schematic view of a first embodiment effluent containment device that may employ aspects of the present disclosure.
Figure 2:
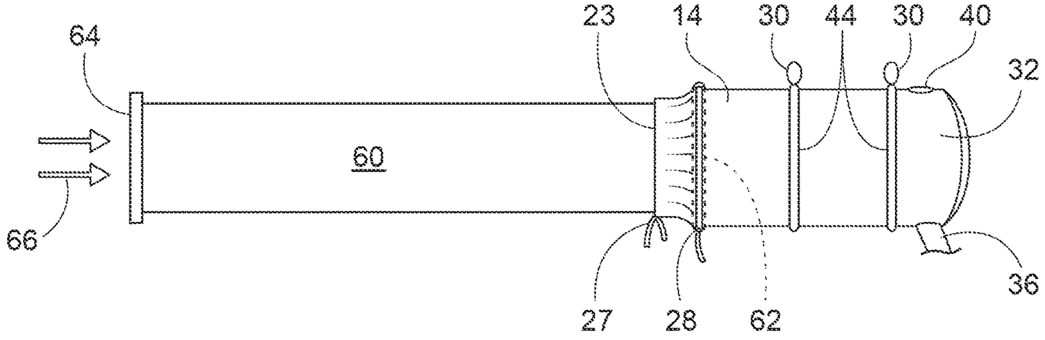
FIG. 2 is a side view of the first embodiment effluent containment device of FIG. 1 mounted on a heat exchanger vessel for hydroblasting cleaning.

According to a first embodiment that illustrates aspects of the technology, referring to FIGS. 1 and 2, an effluent containment device 10 includes a containment bag sidewall 14 suitable for mounting on to a vessel, such as a heat exchanger 60, and a flange strap 28 to retain (or aid in retaining) device 10 in position on heat exchanger 60. Flange strap 28, can be integral with sidewall 14, a separate structure from sidewall 14, retained in loops or a continuous band about sidewall 14, or any combination or variation thereof.

Heat exchanger vessel 60 (in the embodiment shown in the figures) includes a back end 62 and a front end 64. Typically, during cleaning, back end 62 is fully open for ease of mounting bag 10 and for effectiveness is capturing effluent discharge. Front end 64 is also open to the extent needed to provide access to the interior of vessel by a fluid jet apparatus 66, such as a hydroblasting system. Insertion and control of the hydroblasting wands or like fluid jet equipment can be automatic or manual (that is, moved by a person), as will be understood by persons familiar with vessel cleaning processes.

The sidewall 14 of containment bag 10 has an opening 22 for interfacing with the open, back-end 62 of the vessel 60 opposite the operations or front end 64 of the vessel 60 where fluid jet 66 (shown schematically in FIG. 2) is introduced into the vessel 60. Opposite the bag opening 22 (distal from vessel 60), containment bag 14 has an enclosed end 32. Flange strap 28 is disposed proximate the bag opening 22 and preferably is capable of securely tightening and/or securing bag 14 against an outer surface of vessel 60 near the opening or end of the vessel 60. In the embodiment shown in FIG. 2, bag 10 includes a throat portion 24 about the bag opening 22. Throat portion 24 preferably includes a second securing mechanism, such as a strap or drawstring 27 that is capable of being drawn closed at its leading edge 23 around the circumference of the vessel 60.

Strap 28 can retain or affix sidewall 14 onto vessel 60 and, with drawstring 27, prevent or inhibit effluent from exiting between the sidewall 14 and vessel 60 to enhance collection of effluent in the bag 10. Optionally, expansion or support bands 44 and rings 30 may be provided for supporting device 10. In many cases, sidewall 14 is self-supporting and requires no external supports (such as bands 44 and rings 30).

In a cleaning operation, the ends 62 and 64 of vessel 60 are set-up as illustrated schematically in FIG. 2. Bag 10 is placed over the vessel end 62 as described above. Fluid jet 66 for injecting high pressure water (sometimes with additives) is inserted into vessel 60. In this regard, a hydroblasting lance may be used to spray the fluid at a working pressure of at least 10,000 psi and up to, or exceeding, 40,000 psi. Water and the material dislodged by the hydroblasting process, often including hydrocarbons (sometimes at high concentration), referred to effluent, exits vessel 60 through open end 62 and are collected in bag 10. A vent 40 may release over-pressure and a drain outlet 36 may provide an exit for effluent collecting in bag 10 by gravity of by a pump (not shown in the Figures).

Sidewall 14 preferably is made of a flexible and water impermeable material, such as flexible, reinforced, relatively water-impermeable material suitable for resistance to the degradation by the chemical or other properties of the effluent. For systems that employ hydroblasting, the material preferably is resistant to mechanical failure upon impingement of the hydroblasting fluid. For example, a neoprene-coated (or otherwise rubberized) reinforced fabric, often 12 to 80 mil thick, is readily available and useful for many applications of the present device 10. Other suitable bag materials include, without limitation, nylon reinforced polyethylene. Aspects of material parameters are explained below.

Vessel 60 in the embodiment of the figures is illustrated as a right-angle cylinder. Other shapes or configurations of bags (and like enclosures) for handling effluent from cleaning operations are contemplated, such as multiple embodiments disclosed in U.S. Pat. No. 7,753,090 (titled, "Blasting Fluid Effluent Containment Device"), a commercial version of which is marketed under the name HX Containment™ System.

Figure 3:
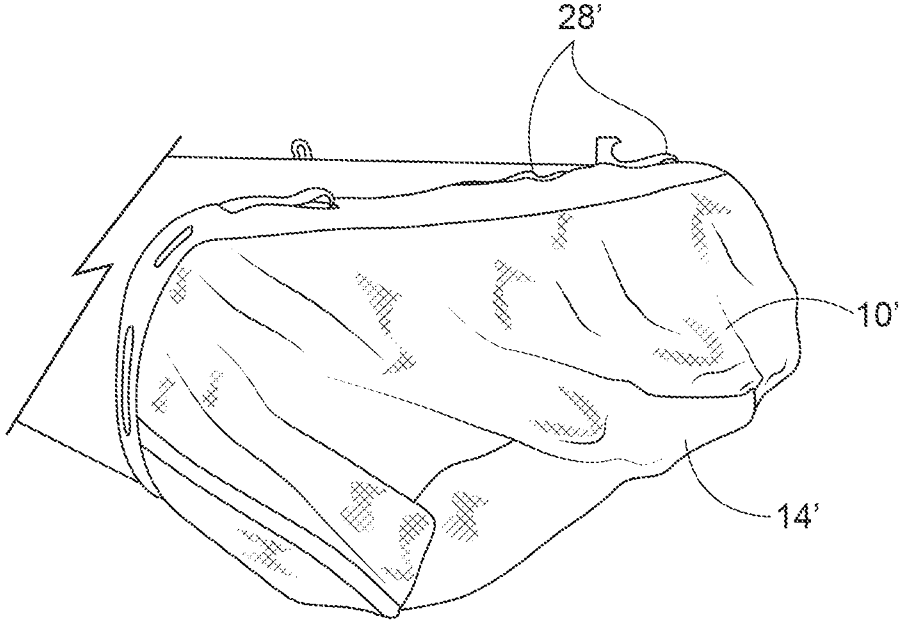
FIG. 3 is a partial, perspective view of a second embodiment effluent containment device that may employ aspects of the present disclosure.

U.S. Pat. No. 9,387,524 (titled, "Effluent Containment Device for Cleaning Fin Fan Coolers") discloses bag-like effluent containment devices of a type suitable for containing effluent from cleaning Fan-Fan-type heat exchangers, and the like. The Fin-Fan effluent container, a commercial version of which is marketed under the name Fin Fan Containment System, may include sheets of material for forming an enclosure that is placed over the open end of a vessel, such as a heat exchanger. FIG. 3, which appears in the 524 patent, is a perspective view of a bag 10' that includes a strap 28' about a heat exchanger, a portion of which is shown schematically.

U.S. Pat. No. 10,610,899 (titled, "Operation-Side Containment Structure for Automated Cleaning of a Process Vessel") discloses an effluent containment device in the form of containment structure (preferably) for use in automated hydroblasting spray cleaning of a process vessel, a commercial version of which is marketed under the name Trough or Trough Containment System. The containment structure can include a skeleton structure and a chemically resistant sheet assembly that typically forms a trough-like structure at the front end of the vessel. That is, the containment structure is located at the end of the vessel where the fluid jets are located, and the containment structure provides containment of hydroblasting spray that may be misdirected or reflected, as well as providing personnel access. It is understood that the description of wall structure and materials of any of the effluent containment devices 10, 10', 110, and/or 210 apply to the embodiment effluent containment device described in the 899 patent.

Figure 4:
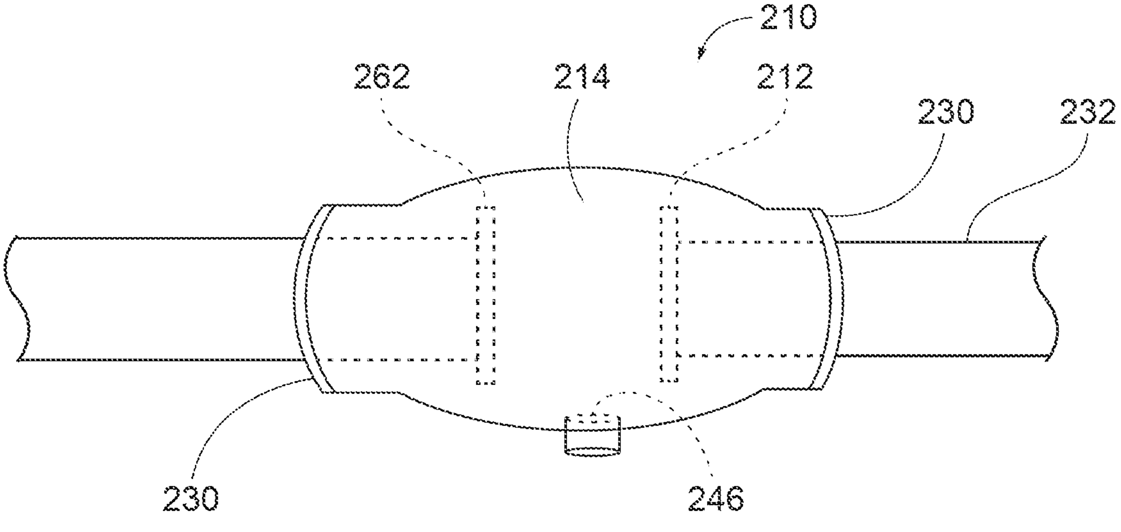
FIG. 4 is a side schematic view of a third embodiment effluent containment device that may employ aspects of the present disclosure.

U.S. Pat. No. 8,944,092 (titled, "Effluent Containment Device") discloses an effluent containment device for containing spilling from a pipe-joint coupling as the coupling is broken open, and/or for containing seepage or leakage from a pipe flange, valve, or like source of leakage or seepage, each of which is encompassed by the term "effluent." As schematically illustrated in FIG. 4, this effluent containment device is sometimes referred to as a wrap or wrap member, as the effluent containment device may be "wrapped" under or about the effluent source. A commercial version of this device is marketed under the name Flange Wrap™.

FIG. 4, which appears in the 092 patent, illustrates an effluent containment device 210 for containing fluid seeping or spilling between flanges 212 and 262 of a pipe joint in a pipe 232. A pipe wrap 214 surrounds the flanges 212 and 262 and includes a drain 246. A closure 230 on each end is provided to cinch pipe wrap 214 to pipe 232.

The flanges 212 and 262 are illustrated as spaced apart in FIG. 4, such as when a valve or other component has been removed. It is understood that effluent containment device 210 may be employed around leaking flange connections, around valves or other components, as well as during maintenance or disassembly of piping or components. The reference numbers of FIG. 4 have a two appended to the beginning of the reference numbers used in the 092 patent.

U.S. Pat. No. 10,195,651 (titled "Blasting Fluid Effluent Containment Device"), which is incorporated herein in its entirety, discloses additional embodiments of an effluent containment devices, including sidewall structures and mechanisms for mitigation the risks associated with flow electrification.

Figure 5:
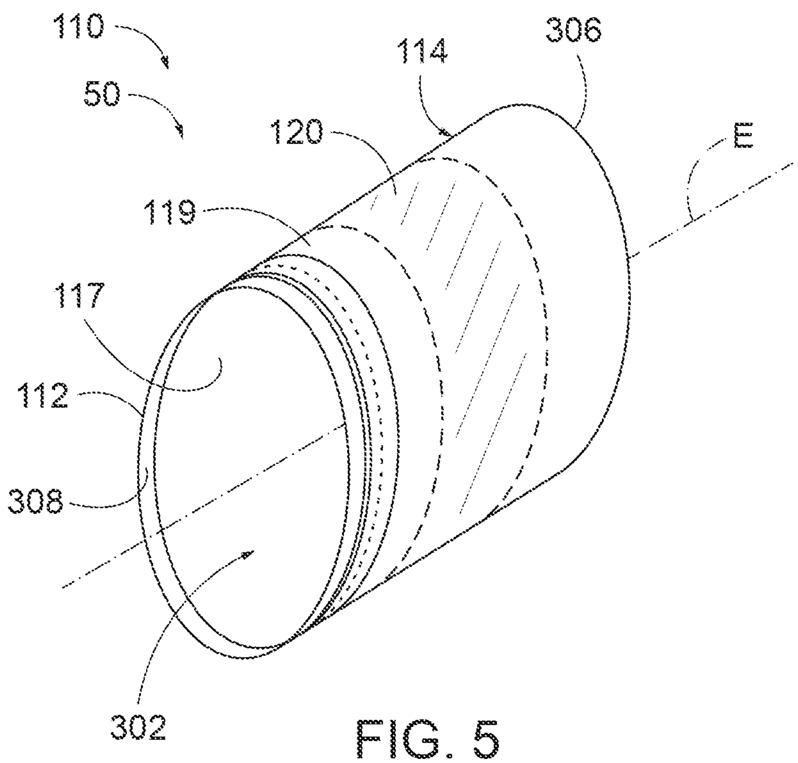
FIG. 5 is a perspective schematic view of a fourth embodiment effluent containment device that may employ aspects of the present disclosure.

FIG. 5, which appears in the 651 patent, illustrates an effluent containment device 110 that includes a bag 50 having a cylindrical body or sidewall 114, a sleeve or wrap 120, a throat opening 302, and an enclosed end 306 opposite opening 302. Effluent containment device 110 also includes a strap and a drain port 116. As with the effluent containment devices 10 and 10', bag 50 is intended to be placed over a vessel (not shown in FIG. 5) and tightened by a strap about a leading edge 112 of device 50. Innermost and outermost layers and surfaces of bag 50 are identified by reference numbers 117 and 119, respectively.

Figure 6:
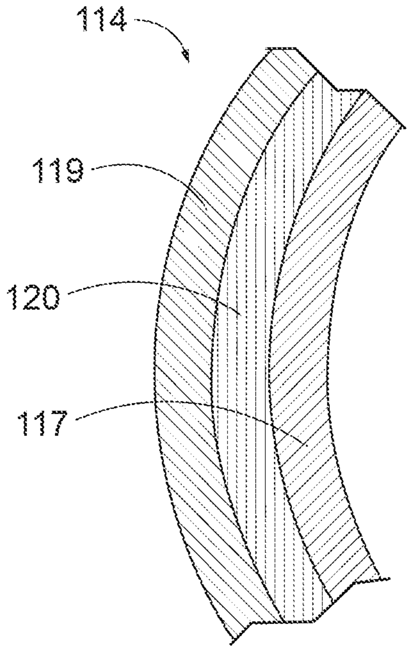
FIG. 6 is a cross sectional view of a portion of the sidewall of FIG. 5.

Device sidewall 114 (including enclosed end 306) may be a single layer of flame-retardant material, as described more fully below, or maybe include multiple layers, as illustrated in the cross section of a portion of sidewall 114 taken through the portion of sidewall 114 that includes sleeve 120 in FIG. 6. The illustration and description of the sidewall 114 may apply to each of the effluent containment devices described herein, such as effluent containment devices 10, 10', and 210 as well as effluent containment device 110 and the devices of 899 patent.

Each device disclosed in U.S. Pat. Nos. 7,753,090; 9,387,524; 10,610,899; 8,944,092; and 10,019,651 is referred to herein as an "effluent containment device." Each of the patents listed in this paragraph are incorporated by reference herein. The structure and function each one of the devices in each of the patents listed in this paragraph is incorporated by reference in its entirety. It is understood that the particular problems addressed in the patents listed in this paragraph, are not intended to be limiting to the present invention in any way. Clear inconsistencies, if any, between and among the subject matter that is incorporated by reference and the present text are intended to be resolved in favor of the description in the present text.

Moreover, the liquid that each one of these effluent containment devices handles or contains is referred to as herein as "effluent," including the flow of liquid from a hydroblasting and/or cleaning operation out of the vessel back end 62 into the bag (such as the HX Containment™ System or the Fin Fan Containment System), the seepage and/or spillage into a wrap member (such as the Flange Wrap™ product), and the misdirected or reflected spray on the front side of a vessel from the fluid jets and/or hydroblasting lances (as encountered for example by the Trough System product).

The conventional thinking had been that safety procedures in petrochemical plants eliminated external initiation sources of combustion around hydroblast cleaning operations. An external initiation source of combustion, as the phrase is used herein, can include sparks from welding, grinding, and/or torch cutting processes (without limitation), and is distinguished from electrostatic charge buildup from flow electrification. The inventor is believed to be the first person to have recognized and assessed the risk of external initiation sources of combustion relative to the conventional polymer materials of effluent containment devices, drawing conclusions that are contrary to the prevailing conventional wisdom in the hydroblasting industry.

At least a portion of the sidewalls of effluent containment devices 10, 10', 110, and 210 is flame-resistant. As explained more fully herein, sidewalls 14, 114, and 214 may be a single layer of flame-resistant material, or a portion of the sidewall may be flame-resistant. Referring to FIGS. 5 and 6 to illustrate the possible wall structure of any of the embodiments 10, 10', 110, and/or 210, one or more of the layers 117 and 119 and sleeve 120 may be flame-resistant. Thus, FIG. 5 schematically illustrates that in some circumstances the bag may not have flame-resistant material in every portion—for non-limiting example, some portions of the bag may be inaccessible or covered. Further, in circumstances in which it is expected that external ignition sources would fall from upper floors, sidewall 14, 14', 114, and/or 214 may have only un upper portion formed of flame-resistant material so as to form a shield.

Thus, in a sidewall 14, 14' 114, and/or 214 that is formed of a single layer of material, the material has the flame resistant properties described below. In a sidewall 14, 14' 114, and/or 214 that is formed on more than one layer (or a portion of which is formed by more than one layer), an outermost layer or surface (such as layer 119) preferably has the flame resistant properties described below. Other layers in a multilayer sidewall preferably also have the flame resistant properties described below. For both single layer sidewalls and multi-layer sidewalls (or sidewalls that have a combination of single layer portion and multilayer portions), the flame resistant properties may be in any appropriate location, such as in the main body of the sidewall and preferably including the portion mating to the vessel and any enclosed end portion. Preferably the entirety of the effluent containment devices 10, 10', 110, and 210 (and the structure of the 899 patent) has flame resistant properties. Preferably the flame resistant properties are achieved by forming the materials of the effluent containment devices of materials having flame-resistance.

A well-known test for evaluating materials for fire safety and flame resistance is the American Society for Testing and Materials (ASTM) Test Method E-84. This test measures a material's reaction after being exposed to fire, in terms of the extent that flame spreads in the material and the smoke density created by the flame, which are reported as Flame Spread Index (FSI) and Smoke Developed Index (SDI).

The ASTM E84 test protocol, as published, exposes a sample to controlled, standardized combustion conditions to measure, among other things, progress of the flame in the material and smoke development. The Flame Spread Index results are standardized to a non-dimensional scale of 0 (zero) to at least 200. Asbestos-cement board defines the lower endpoint of zero, and thus can be referred to as incombustible. Red oak wood defines an FSI value of 100. Materials are grouped in classes according to their Flame Spread index for purposes of drafting building and safety codes, as follows Flame Spread Rate Index Chart:

Class A: Flame Spread Index 0-25
Smoke Developed Index 0-450
Class B: Flame Spread Index 26-75
Smoke Developed Index 0-450
Class C: Flame Spread Index 76-100
Smoke Developed Index 0-450

It has been determined that sidewall 14, 14', 114, and/or 214 of the effluent containment devices disclosed herein can have a Flame Spread Index of greater than zero and no more than approximately 45. A sheet metal shell, such as been occasionally used in the prior art, would have an FSI of zero and thus be incombustible. Thus, the FSI of greater than zero reflects an acknowledgement that the material(s) of the effluent containment devices disclosed herein are not "fireproof" or incombustible, but rather are flame-resistant, as defined more fully herein. For example, upon encountering a spark from welding, grinding, and/or torch cutting processes, the material of sidewall 14, 14', 114, and/or 214 may melt or even slowly propagate a flame for a short distance without conflagration or deflagration or a sustained diffusion flame—that is, without supporting self-sustaining combustion of the material of sidewall 14, 14', 114, and/or 214.

The terms "conflagration" and "self-sustaining combustion" are used interchangeably herein. The term "deflagration" refers to combustion propagating through heat transfer such that hot burning material heats the next layer of cold material and ignites it. Most "fire" found in daily life, from flames to explosions, is deflagration. Deflagration is distinguished from detonation, which is supersonic and propagates through shock. The term "diffusion flame" refers to combustion in which the fuel and oxygen are separated. Often the flame is limited by diffusion rates. A diffusion flame is distinguished from premixed combustion.

In this regard, the term "combustion initiation source" is used herein to refer (without limitation) to hot matter (for example sparks, splatter, molten metal or other materials, slag, and the like) emitted from welding, grinding, and/or torch cutting processes, as well as any other process that produces a source of ignition of polymer bag material. The inventors surmise that materials typically employed in effluent containment devices, upon encountering a combustion initiation source under the right conditions, may undergo self-sustaining combustion, possibly a diffusion flame mode and/or a deflagration.

The inventors have determined that the ability of the material of an effluent containment device may not enable self-sustaining combustion may be represented by the flame safety index of the material. Preferably, at least layer of sidewall 14, 14', 114, and/or 214 has an FSI of no more than approximately 70, preferably less than approximately 60, preferably less than approximately 50, preferably less than approximately 40, preferably less than approximately 35, preferably less than approximately 30, preferably less than approximately 25, preferably less than approximately 20, preferably less than approximately 15 and even more preferably less than approximately 10. The lower range of sidewall FSI is greater than zero, or greater than approximately 2.

Any material that meets the requirements for use as an effluent containment device having an FSI value in any of the ranges above may be employed. The material employed preferably is flexible to the extent that the effluent containment device can be folded or rolled for packaging and transporting. In the embodiment in which the effluent containment vessel is a bag, the material of the bag (such as device 10, 10 and/or 110) may have a stiffness such that the bag does not collapse on itself and approximately maintains its intended or designed shape upon mounting on the vessel 60. In this regard, a perfect geometric or designed shape is not required, nor is it required that the bag not droop or be unwrinkled after installation. In many circumstances the distal end of the bag (such as ends 32 and/or 306) may droop such that the distal end of the bag is supported on a floor or grating on the same level as the operator stands during hydroblasting. Further, the material may resist impingement from a hydroblasting wand in circumstances in which the hydroblasting wand extends through end of the vessel 30 into the chamber defined by the bag. Alternatively, a liner may be employed in the portions of the bag that may receive impingent from a hydroblasting stream.

A material employed for any of the present effluent containment devices may be treated with or formed with additives to enhance fire retardant capacity to achieve the desired FSI value. Non-limiting examples of flame retardant technology that may be employed to achieve the desired FSI value are provided herein. A person familiar with commercial flame retardant materials, coatings, and like technology and materials may apply any of the technology herein or other conventional coatings, additives, and or the like to achieve the desired flame resistance for the sidewall 14, 14', 114, and/or 214, and thus achieve the desired property of not supporting self-sustaining combustion.

For example of some flame retardants, phosphorus-based flame retardants are a common halogen-free additive for many polymers, such as polyethylene. Phosphorus-based FRs include red phosphorus (RP), phosphine oxides, phosphines, phosphonates, phosphates, ammonium phosphate, and phosphites. These flame retardants can inhibit flame propagation and/or reduce the magnitude of the heat release by controlling melt flow, forming an acid on the surface, and/or forming a char layer on the surface. Phosphorus flame retardants may also scavenge the hydrogen and hydroxyl radicals upon volatilization increase flame retardant characteristics.

Melamine (MLM) may also be combined with phosphorus compounds, for example as MLM phosphate, in improve flame resistant characteristics of polymers and other suitable materials Other examples of MLM compounds that may be employed include melamine cyanurate (MC), melamine pyrophosphate (MP), and melamine polyphosphate (MPP).

Nitrogen-based flame retardants also may be employed to achieve a polymer having a desired FSI. Examples of nitrogen-based flame retardants include ammonia, MLM and their derivatives, urea, guanidine, cyanuric acid-based compounds, and the like.

Inorganic hydroxides also may be employed. Examples of inorganic compounds that may be employed to achieve a desired FSI include ATH, magnesium hydroxide (MH), and water-soluble boron compounds (such as sodium borate (borax), BA, and boron-oxide), and water-insoluble boron compounds.

The base material for sidewall 14, 14', 114, and/or 214 include, for example, commercially available laminated layers of linear low-density polyethylene (LLDPE) and a high strength cord grid. LLDPE satisfies the well-known hydroblasting requirements relating to of tear and puncture resistance, low permeability to moisture, and flexibility and light weight. In addition to the application of the flame retardant means to the material, the particular physical and chemical properties of the material may be chosen according to the particular conditions to be encountered by the effluent containment device. In this regard, the material thickness, number of layers, reinforcement mesh properties and dimensions, manufacturing methods, particular polymer chemistry, and like properties (in addition to considering the desired level of flame resistance and the interactions of the flame retardant technology with the base material) may be chosen according to the particular conditions expected to be encountered by the effluent containment device, as will be understood by persons familiar with effluent containment devices Moreover, the preferred material for wall 14, 14', 114, and/or 214 may also have anti-static properties. In general, antistatic agents can be used to treat materials or their surfaces in order to reduce or eliminate buildup of static electricity from flow electrification. Some agents work by making the surface or the material less conductive. Some antistatic agents are themselves conductive. Internal anti-static agents are designed to be mixed directly into the material (such as in the plastic matrix), external antistatic agents are applied to the surface.

Many common antistatic agents are based on long-chain aliphatic amines and amides, quaternary ammonium salts, esters of phosphoric acid, polyethylene glycol esters, polyols, or indium tin oxide or antimony tin oxide, as described more fully in the 651 patent. Carbon black, conductive fibers, and nanomaterials also may be employed.

In addition, internal antistatic agents may be mixed directly into the polymer matrix, and/or external antistatic agents can be allied to one or both surfaces 117 and 119—preferably inboard surface 117. The antistatic agent can make change the electrical resistivity of the material, as needed, by for example absorbing moisture from the air or fluid. Accordingly, humectants may be employed as anti-static agents having both hydrophilic and hydrophobic areas, similar to those of a surfactant such that the hydrophobic side interacts with the surface of the material, while the hydrophilic side interacts with the air moisture and binds the water molecules.

Moreover, polymer materials can be categorized based on their electrical surface resistance and/or surface resistivity, which measures the ability of electric charge can travel across a substance. Static dissipative plastics, which are a subset of anti-static materials, have a surface resistance between 1×10^6 ohms/square and 1×10^11 ohms/square, as measured by an SRM200 Surface Resistance Meter or like industry standard.

Materials in this range of resistance values are generally considered to be above materials referred to as conductive and below those considered to be resistive. Dissipative materials are considered to provide controlled dissipation by allowing electrical charges to flow to ground relatively slowly and in a controlled manner to prevent uncontrolled electrostatic discharge.

Other anti-static materials can reduce the risk of uncontrolled electrostatic discharge by inhibiting flow electrification and/or the triboelectric effect. These anti-static materials often have a surface resistance or resistivity of 1×10^10 to 1×10^11 ohm/square and thus are less insulative (more conductive) than materials classified as insulative, which have high resistance of greater than 1×10^12 ohms/square. These materials provide a slow rate of decay of static charge from a hundredth of a second to several seconds. For example, if a charge of 200 volts is developed or applied to the commercial version of the effluent containment device 10, the time for the voltage to decay from the device is between 0.01 seconds to approximately six seconds, preferably less than four seconds, as measured according to industry acceptable tests.

Preferably, the anti-static material and configuration used for sidewall 14, 14', 114, and/or 214 is capable of generating less than 400 volts and preferably less than 200 volts, measured according to conventional surface measurement technology, and employing the fluid and flow rates typical of conventional hydroblasting operations. See A. Borjesson, "A Method For Measurement Of Triboelectric Charging," Electrical Overstress/Electrostatic Discharge Symposium Proceedings, Phoenix, AZ, USA, 1995, pp. 253-261, doi: 10.1109/EOSESD.1995.478293.

The materials making up any part of any of the sidewall 14, 14', 114, and or 214 may also have anti-static properties—that is, formed of materials considered to be dissipative and/or inhibiting flow electrification and/or the triboelectric effect. Further, the structures described in the 651 patent may be employed to dissipate electrostatic charge.

In operation, for example, an effluent containment device 10, 10', or 110 can be installed on the open end vessel 60 to be cleaned by a hydroblasting operation. If the effluent containment device encounters a combustion initiation source, such as sparks from welding or grinding, it is expected that the material of sidewall 14, 14', 114, and/or 214 may be damaged, such as by melting a through hole. Further, a flame may propagate for a short distance through the sidewall, depending on the particular parameters of the materials and the initiation source, as the FSI of the material is greater than zero. The low FSI of the sidewall reflects the inability of the material of sidewall maintain combustion without the continuous application of heat or other combustion enhancement.

While the above description provides illustrations, explanations, and/or examples of the present inventions, it is not intended that the above text or figures limit the scope of the invention in any way. Further, the description of the particular details of any of the embodiment disclosed herein or in the patents incorporated by reference apply equally to all embodiments unless stated otherwise. It is intended that the invention be given their fair scope without undue limitations being read into the claims from the specification's embodiments and explanation.

I claim:

1. An effluent containment device for handling effluent from a hydroblasting operation, comprising:
  - an interface portion adapted for coupling with an end of an effluent source;

an enclosure adapted for containing effluent from a hydroblasting operation, the enclosure having a sidewall that is flexible and formed of material comprising a flame-resistant material having Flame Spread Index (FSI) greater than zero and no more than 70;

whereby the sidewall will not support self-sustaining combustion upon encountering a combustion initiation source.

2. The effluent containment device of claim 1 wherein the flame-resistant material has an FSI of no more than 50.

3. The effluent containment device of claim 1 wherein the flame-resistant material has an FSI of no more than 25.

4. The effluent containment device of claim 1 wherein the flame-resistant material has an FSI of no more than 10.

5. The effluent containment device of claim 1 wherein the sidewall is formed from a material having anti-static properties.

6. The effluent containment device of paragraph 5 wherein the effluent containment device is adapted to generate no more than 400 volts upon flow electrification during hydroblasting.

7. The effluent containment device of paragraph 5 wherein the effluent containment device is adapted to generate no more than 200 volts upon flow electrification during hydroblasting.

8. The effluent containment device of paragraph 5 wherein at least a portion of the sidewall has an electrical surface resistance between 1×10^6 ohms/square and 1×10^11 ohms/square, such that the sidewall is classified as dissipative.

9. The effluent containment device of claim 1 wherein the sidewall includes at least two layers, the flame-resistant material being an outermost one of the at least two layers of the sidewall.

10. The effluent containment device of claim 1 wherein the sidewall includes at least two layers, the flame-resistant material being an innermost one of the at least two layers of the sidewall.

11. The effluent containment device of claim 1 wherein the sidewall includes at least three layers, the flame-resistant material being an inner layer between an innermost of the sidewall and an outermost layer of the sidewall.

12. The effluent containment device of claim 1 wherein the sidewall is formed of a single layer that is the flame-resistant material.

13. The effluent containment device of claim 1 wherein the effluent containment device is adapted for withstanding direct impingement on an interior surface from a hydroblasting wand.

14. The effluent containment device of claim 1 wherein the effluent containment device is one of an effluent containment bag adapted for collecting effluent from a hydroblasting operation, an operator-side trough, and a wrap adapted for receiving leakage from a pipe flange or valve.

15. A method of using the effluent containment device comprising the steps of:

installing the effluent containment device of claim 1 to a source of effluent; and capturing the effluent from source in the effluent containment device.

16. A vessel and effluent containment device combination comprising:

a vessel that is a source of effluent; and an effluent containment device mounted on the vessel and adapted for containing the effluent, the effluent containment device comprising:

an interface portion adapted for coupling with an end of an effluent source;

an enclosure adapted for containing effluent from a hydroblasting operation, the enclosure having a sidewall that is flexible and formed of material comprising a flame-resistant material having Flame Spread Index (FSI) greater than zero and no more than 70;

whereby the sidewall will not support self-sustaining combustion upon encountering a combustion initiation source.

17. The vessel and effluent containment device combination of claim 16, wherein the vessel can be a heat exchanger in a hydroblasting cleaning operation.

18. The vessel and effluent containment device combination of claim 16, wherein the effluent containment device includes a drain adapted for effluent to flow through.

19. The vessel and effluent containment device combination of claim 16, wherein the effluent containment device can be a bag for capturing effluent from hydroblast cleaning, a flange wrap for capturing spilling or leakage from piping, and/or a trough for capturing misdirected or reflected spray from a vessel cleaning operation.

* * * * *